M. BERGOUGNAN.
APPARATUS FOR THE VULCANIZATION OF PNEUMATIC TIRES WITH NON-SKID LEATHER TREADS.
APPLICATION FILED DEC. 16, 1911.

1,170,600.

Patented Feb. 8, 1916.

WITNESSES:
John C. Sanders
Albert F. Steuman

INVENTOR:
Mathieu Bergougnan
BY
ATT'Y.

UNITED STATES PATENT OFFICE.

MATHIEU BERGOUGNAN, OF PARIS, FRANCE, ASSIGNOR TO SOCIETE GENERALE DES ETABLISSEMENTS BERGOUGNAN, OF CLERMONT-FERRAND, FRANCE.

APPARATUS FOR THE VULCANIZATION OF PNEUMATIC TIRES WITH NON-SKID LEATHER TREADS.

1,170,600.     Specification of Letters Patent.     Patented Feb. 8, 1916.

Application filed December 16, 1911. Serial No. 666,247.

*To all whom it may concern:*

Be it known that I, MATHIEU BERGOUGNAN, citizen of France, residing at 9 Rue Villaret de Joyeuse, Paris, in the Republic of France, have invented new and useful Improvements in Apparatus for the Vulcanization of Pneumatic Tires with Non-Skid Leather Treads, of which the following is a specification.

This invention has for its object to provide an improved apparatus for the hot vulcanization of pneumatic tires with non-skid leather treads.

The mold which contains the tire to be vulcanized is clamped between the heated plates of a press, and is composed of two casing parts and a between-part or crown fitted between the inner edges of these casing parts. Each casing part is shaped internally to the exact shape of the corresponding half of the tire including its thickened edges, except at the place for the non-skid studs where the casing parts have each a recess for the reception of those studs.

Figure 1:
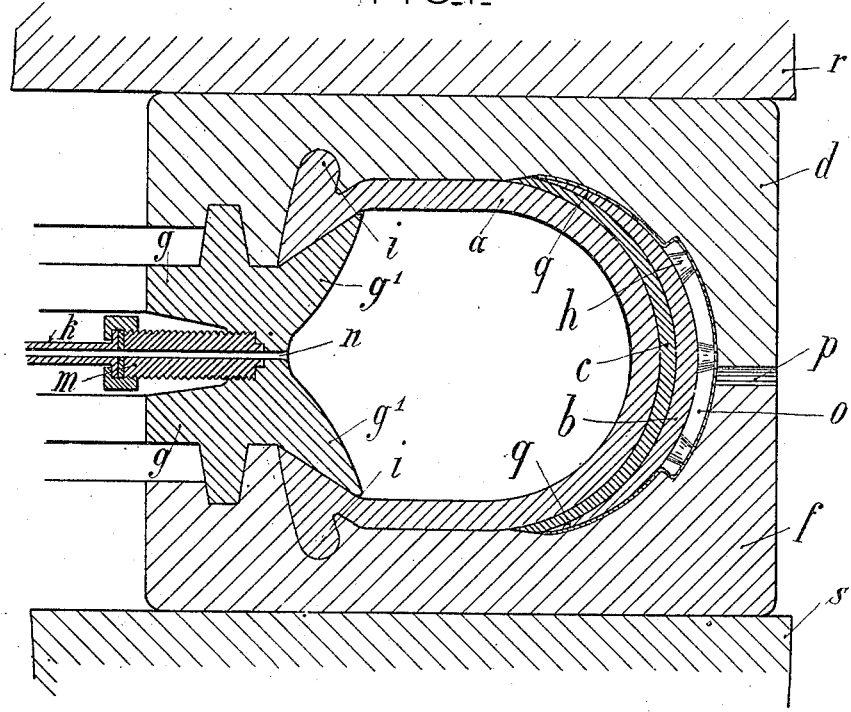
Figure 2:
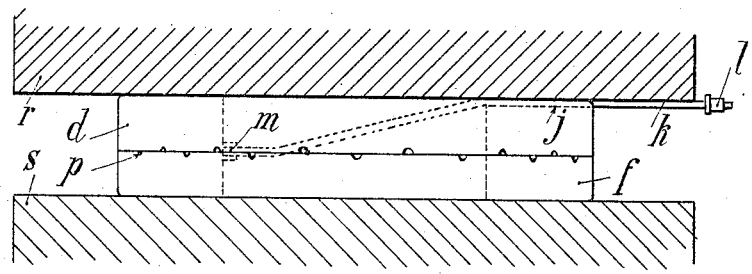

One construction of vulcanizing apparatus according to this invention is illustrated by way of example in the accompanying drawing in which:

Figure 1 is a partial cross section of the apparatus, and Fig. 2 is a diagrammatic partial view of a press with the mold in position therein.

As shown, the tire under treatment comprises a tire proper or tire cover $a$ and a non-skid tread or studded leather band $b$ with an interposed layer $c$ of crescent-shaped section composed of one or more thicknesses of canvas and rubber. The above parts having been assembled to form the tire, the latter is placed in a mold composed of two metal casing parts $d$ $f$ with an interposed metal crown $g$ having two annular flanges $g'$ and connected to the casing parts by means of tongue and groove joints. The internal cross sectional contour of the two casing parts when fitted together conforms exactly to the outer cross sectional contour of the combined tire and non-skid band except the portions for receiving the studs $h$, for which purpose these portions are formed with recesses $o$. The crown $g$ is designed to secure a tight joint at the thickened edges $i$ of the tire. For this purpose these edges $i$ are made of such dimensions that when the crown and the casing parts are assembled and the resulting whole is placed in the press, there will remain for the reception of the thickened edge of the tire between the annular flanges $g'$ of the crown and the casing parts, only a space which is smaller than the said thickened edges, so that the latter will be compressed to an extent sufficient to effect an air-tight joint at those places. The whole consisting of the casing parts, the crown, and the contained tire, is then placed between the heating plates $r$ $s$ of a hydraulic press.

A groove $j$ (Fig. 2) is provided in the outer face of one of the casing parts $d$ for the reception of a pipe $k$ terminating at one end in a cock $l$ adapted to be connected to an air compressor. The other end of the pipe $k$ ends in a union $m$ screwed into the crown $g$, and communicating through a hole $n$ in the crown with the interior of the tire. By this means air may be introduced into the tire at a pressure varying according to the sectional dimensions of the tires to be treated. This pressure being supplied by an air compressor may be maintained continuously at the exact amount desired.

The recesses $o$ provided for the reception of studs $h$ in the inner faces of the casing parts near their jointing edges communicate freely with the atmosphere by means of small vents $p$ constituted by grooves formed in the jointing faces of the casing parts in suitable number and distribution at the periphery. By that arrangement and by means of a strip $q$ of cotton fabric placed between the outside face of the leather band and the inside face of the casing parts, the presence of a thin layer of air between the metal casing parts and the leather is secured, which air protects the leather and prevents it from being burned by the heat of the casing parts.

Having now described my invention, what I claim as new and desire to secure by Letters Patent is:

1. In an apparatus for vulcanizing pneumatic tires having non-skid bands of leather or similar material, a mold adapted to fit a tire of the class described, said mold having a recess adapted to surround the non-skid band of the tire, and a foraminous member positioned within the said recess in interposed relation to the said tire band and the mold walls, the mold being provided with air ducts leading outwardly from the recess at a number of places to afford a circulation of air within the interstices of the foraminous member.

2. In an apparatus for vulcanizing pneumatic tires having non-skid bands of leather or similar material, a mold adapted to fit a tire of the class described, said mold having a recess adapted to surround the non-skid band of the tire, and a fabric sheet positioned within the said recess in interposed relation to the said tire band and the mold walls, the mold being provided with air ducts leading outwardly from the recess at a number of places to afford a circulation of air within the interstices of the fabric sheet.

3. In an apparatus for vulcanizing pneumatic tires having non-skid bands of leather or similar material, an annular mold adapted to fit a tire of the class described, said mold having a circumferential recess adapted to surround the non-skid band of the tire, and a foraminous member positioned within the said recess in interposed relation to the said tire band and mold walls, the mold being provided with circumferentially spaced air ducts leading outwardly to the atmosphere from the recess to afford a circulation of air within the interstices of the foraminous member.

4. In an apparatus for vulcanizing pneumatic tires having studded non-skid bands of leather or similar material, an annular mold adapted to fit a tire of the class described, said mold having a circumferential recess adapted to surround the non-skid band of the tire, said recess being provided with an enlarged central portion for the accommodation of the studs of the band, and a foraminous member positioned within the said recess in interposed relation to the said tire band and the mold walls, the mold being provided with circumferentially spaced air ducts leading outwardly from the enlarged portion of the recess to the atmosphere to afford a circulation of air within the recess and the interstices of the foraminous member.

5. In an apparatus for vulcanizing pneumatic tires having non-skid bands of leather or similar material, a mold adapted to fit a tire of the class described, said mold having a recess adapted to surround the non-skid band of the tire, a foraminous member positioned within the said recess in interposed relation to the said tire band and the mold walls, the mold being provided with air ducts leading outwardly from the recess at a number of places to afford a circulation of air within the interstices of the foraminous member, and means for supplying air under pressure to the tire positioned within the mold.

6. In an apparatus for vulcanizing pneumatic tires having non-skid bands of leather or similar material, a split mold adapted to embrace the sides of a tire of the class described, said mold having recess portions in its interior surfaces adjacent to adjoining edges of the mold and adapted to register and surround the non-skid band of the tire, the mold being provided in the said adjoining edges with relatively spaced grooves extending from the recess to the atmosphere and forming ducts adapted to afford a circulation of air within the recess, and a foraminous member positioned within the recess in interposed relation to the said tire band and the mold walls.

7. In an apparatus for vulcanizing pneumatic tires having non-skid bands of leather or similar material, an annular split mold adapted to embrace a tire of the class described and to fit between the heated plates of a press, an annular crown adapted to fit within the mold in engagement with the base flanges of the tire to press the same against the sides of the mold and effect an air-tight joint, the said crown being provided with a radial opening communicating with the interior of the mold, the mold being provided in one of its exterior side faces with a radial groove, a tube for admitting air under pressure to the interior of the tire positioned within the mold, the said tube being arranged in communication with the crown opening and being extended outwardly from between the heated plates of the press through the said groove in the mold, and means provided within the mold for protecting the non-skid band of the tire from overheating.

8. In an apparatus for vulcanizing pneumatic tires having non-skid bands of leather or similar material, an annular split mold adapted to embrace a tire of the class described and to fit between the heated plates of a press, an annular crown adapted to fit within the mold in engagement with the base flanges of the tire to press the same against the sides of the mold and effect an air-tight joint, the said crown being provided with a radial opening communicating with the interior of the mold, the mold being provided in one of its exterior side faces with a radial groove, a tube for admitting air under pressure to the interior of the tire positioned within the mold, the said tube being arranged in communication with the crown opening and being extended outwardly from between the heated plates of the press through the said groove in the mold, the mold being provided further with recess portions in its interior surfaces which register and surround the non-skid band of the tire, and a foraminous member positioned within the said recess in interposed relation to the said tire band and the mold walls, the mold being provided with air ducts leading outwardly from the recess at a number of places to the atmosphere to afford a circulation of air within the interstices of the foraminous member.

In testimony whereof I have signed my name to this specification in the presence of two subscribing witnesses.

MATHIEU BERGOUGNAN.

Witnesses:
ANTOINE LAVOIS,
H. C. COXE.

Copies of this patent may be obtained for five cents each, by addressing the "Commissioner of Patents, Washington, D. C."